Figure 1:
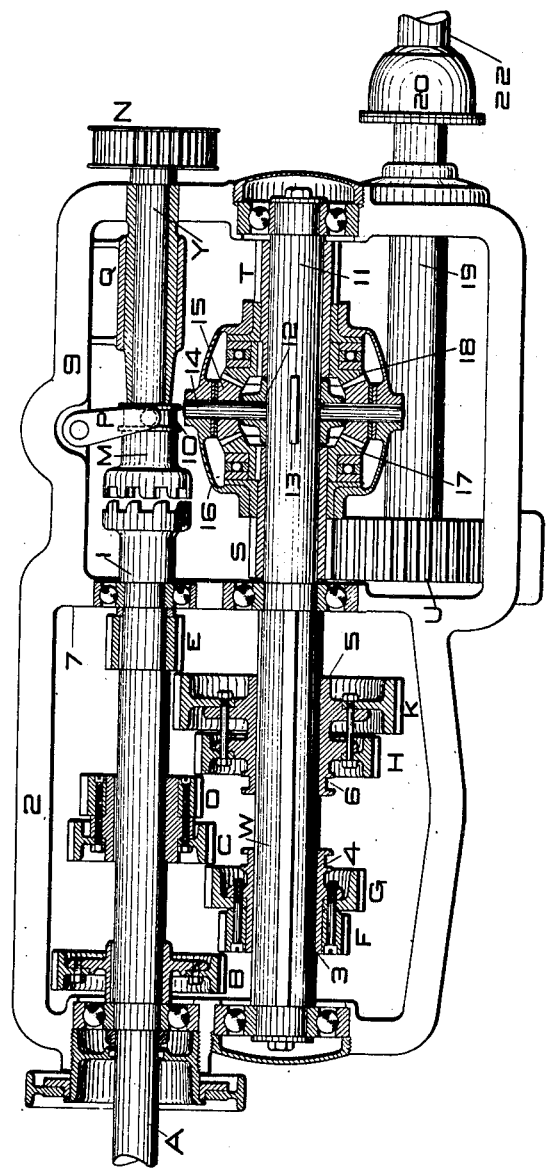

No. 885,505. PATENTED APR. 21, 1908.
H. G. McCOMB.
DRIVING GEAR FOR AUTOMOBILES.
APPLICATION FILED JAN. 2, 1907.

3 SHEETS—SHEET 1.

WITNESSES

INVENTOR
Henry G. McComb
By Parker W Burton
Attorneys.

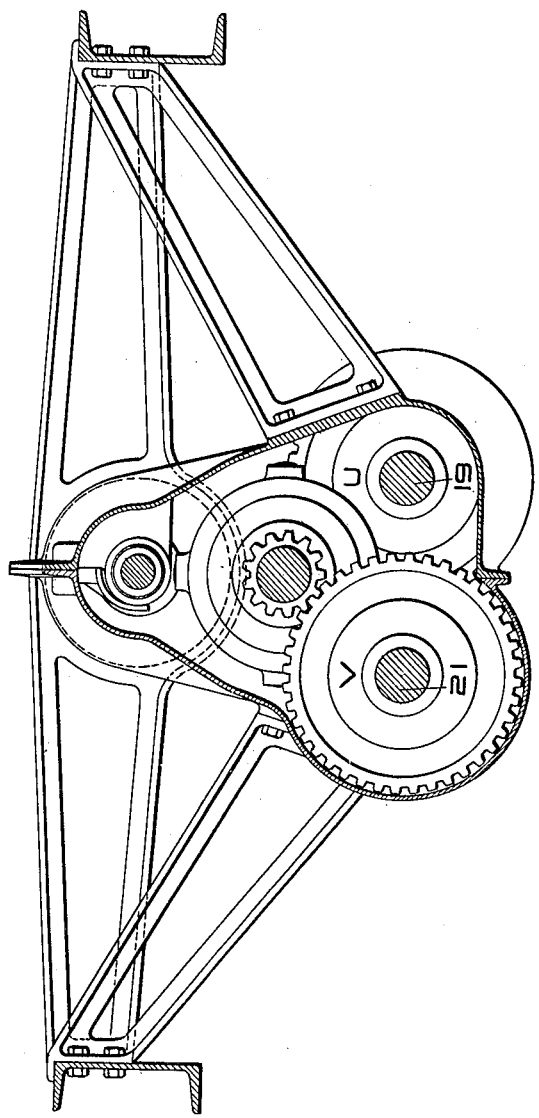

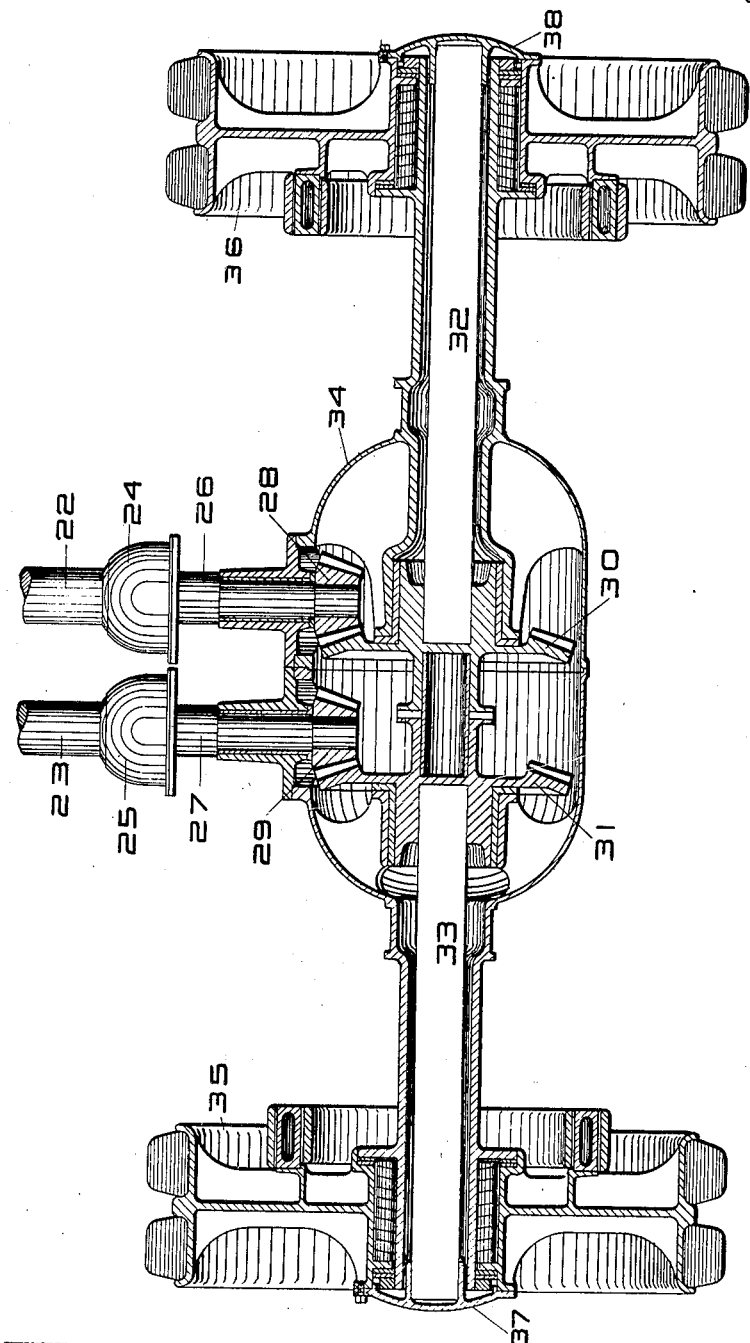

UNITED STATES PATENT OFFICE.

HENRY G. McCOMB, OF DETROIT, MICHIGAN.

DRIVING-GEAR FOR AUTOMOBILES.

No. 885,505.　　　　Specification of Letters Patent.　　　Patented April 21, 1908.

Application filed January 2, 1907. Serial No. 350,441.

*To all whom it may concern:*

Be it known that I, HENRY GOODMAN McCOMB, a citizen of the United States, residing at Detroit, county of Wayne, State of Michigan, have invented a certain new and useful Improvement in Driving-Gears for Automobiles, and declare the following to be a full, clear, and exact description of the same, such as will enable others skilled in the art to which it pertains to make and use the same, reference being had to the accompanying drawings, which form a part of this specification.

This invention relates to driving gears for automobiles.

It has for its object an improved driving gear, which includes what is commonly known as transmission and differential gears, applicable for use with very heavy trucks.

One object of the invention is to produce a driving gear by which the rate of speed of the vehicle can be varied.

Another object is to produce a driving gear by which the application of the power is made to both of the wheels at the rear of the car, and at the same time, provision is made to enable either of the ultimately driven vehicle wheels to move with an angular velocity, differing from that of its companion wheel.

Another object is to produce a motive power which may be entirely disconnected from the truck wheels and connected with another transmission wheel by which the power of the motor can be utilized as a stationary motor.

In the drawings:—Figure 1, shows the transmission gear and the auxiliary mechanism for disconnecting the transmission gear from the vehicle wheels and connecting it at will to a driving wheel. Fig. 2, is an end view of the transmission mechanism shown in Fig. 1. Fig. 3, is a section lengthwise of the vehicle axle; it shows the means employed to connect the transmission gear to the axle.

The transmission gear is of the character known as a sliding gear transmission mechanism; the main driving shaft A has fixed upon it, wheels of different diameters B, C, D, and E; these wheels and the portion of the shaft upon which they are fixed are included in a case 2 in which there is mounted a counter shaft W; upon the counter shaft are splined a number of hubs carrying gear wheels F, G, H and K, equal in number to the fixed wheels upon the shaft A, and of proper diameter to intermesh each with a companion gear; thus the gear F may intermesh with the gear B, the gear G may intermesh with the gear C, the gear H may intermesh with the gear D, and the gear K may intermesh with the gear E. If it is desired to obtain a reverse movement of the shaft W, some such well known means as an idler gear thrown into mesh with both K and E may be resorted to. The gears F and G are mounted upon a hub 3, provided with a suitable groove 4 by means of which the hub and the gear mounted thereon may be caused to travel along the shaft W, but the hub itself is splined to the shaft W and the hub and the gear mounted thereon rotate with the shaft. The wheels H and K are mounted upon another hub 5 splined to the shaft W but movable longitudinally thereon and moved by the application of a lever to the groove 6 of the hub; the forks which engage the hubs 3 and 5 are not shown in the drawing, as the mechanism thus far described is in common use.

The shaft A is extended through a diaphragm 7 that crosses the casing 2 and is provided on its projecting end (which projects into a second casing) with a clutch member L. Within the casing or frame 9 is mounted a shaft Y in axial alinement with the shaft A; upon this shaft is mounted at one end a transmission gear wheel N either a gear or a sprocket gear, bevel gear, or a worm, as may be most applicable to the purpose for which it is to be used. Upon the end of the shaft Y which is adjacent to the clutch member L is a sliding clutch member M splined to the shaft Y and controlled by a fork P that engages in the groove 10 on the end of the sleeve which forms part of the clutch member M. All of the possibly intermeshing gears in the case 2 may be thrown out of engagement so that the motion of the shaft A is not transmitted to the shaft W and contemporaneously, if desired, the clutch members L and M may be shifted into engagement and under such conditions of the machine, the power generally and normally employed for actuating the vehicle may be employed for other purposes, and the motor power may thus be utilized after the manner of a donkey engine.

When the motor power is employed for actuating the vehicle, it is transmitted through the shaft W and through an extension 11 external to the diaphragm 7. In the frame, or in the case 9, there is fixed, on the shaft 11 by the key 13, a hub 12, in which are fixed the studs 14, which carry the idler bevel gears 15. The idler bevel gears 15 mesh with bevels 17 and 18, which are inclosed in the case or frame 16. Keyed to the bevel gears 17 and 18 are the sleeve gears S and T. This forms a balanced, or "differential" gear, so that under certain conditions S and T rotate at equal speeds, at the same rate as the shaft 11, but under other conditions they may rotate at different speeds, either in relation to each other or to the shaft 11.

The sleeve gear S meshes with the gear U, which is fixed to the countershaft 19. At the end of the countershaft 19 is a universal joint, the casing of which is marked 20. The sleeve gear T meshes with a gear V mounted on the countershaft 21. The rotation of the shaft 11 is transmitted to the pinions S and T. The rotation of the pinion S is transmitted to the shaft 19; the rotation of the pinion T is transmitted to the shaft 21; these shafts 19 and 21 are coupled, by universal couplings (which are contained in the housings 20, 24 and 25) and by shafts 22 and 23 to extension shafts 26 and 27; each of the shafts 26 and 27 has mounted on its end a bevel gear. The bevel gear 28 on the end of the shaft 26 meshes with the bevel gear 30 on the inner end of the half axle 32 of the truck; the bevel gear 29 on the end of the shaft 27 meshes with a bevel gear 31 mounted on the inner end of the half axle 33, the two half axles, 32, 33, constitute the rear axle of the truck. The two adjacent ends of the truck axle, the bevel gears mounted thereon, and the bevel gears 28 and 29 by which the half axles are driven are all included in an oil tight case 34; the ends of which case form hollow axles upon which are mounted the truck wheels 35 and 36. The wheels, themselves, are preferably mounted on roller bearings; one wheel is driven by a connection 37 between the axle 33 and the hub of the wheel 35, the companion wheel is driven by a connection 38 between the axle 32 and the hub of the wheel 36. With this construction, each driving wheel of the vehicle is actuated by its own driving shaft and the intermeshing connections between the two may be made larger and stronger, and for this reason, less liable to break or strip.

The force transmitted through the interconnecting parts is only that required to drive the single wheel, and the wear on the connecting parts is correspondingly decreased from what it would be, were all the power required to drive the wheels transmitted through a single shaft. Under conditions making it necessary to allow for a different axial velocity of the two truck wheels, the difference in axial speeds of the two wheels is taken up in the differential gearing employed between the sleeve gears S and T.

What I claim is:—

1. In combination a power shaft, a plurality of gear wheels fixed thereto, a counter shaft, complementary gear wheels carried thereby and adapted to be thrown into and out of operative connection with said first mentioned gear wheels, a plurality of driving wheel mechanisms, each deriving their power therefrom independently of the other, and a second counter shaft axially in line with the power shaft and adapted to be thrown into clutching engagement therewith to receive from it the power ordinarily transmitted to the first named counter shaft, substantially as described.

2. The combination of a shaft W through which power is transmitted, two parts of a balanced gear sleeved on said shaft, means for transmitting power from said shaft to said parts of the balanced gear, a gear wheel upon each of said parts, a counter-shaft, a gear wheel thereon meshing with one of said gear wheels, a second counter-shaft, a gear wheel thereon meshing with the other of said gear wheels, the severed halves of an axle, and connections independently coupling the halves of said axle with said counter-shafts.

3. The combination of a shaft W through which power is transmitted, two parts of a balanced gear sleeved on said shaft, means for transmitting power from said shaft to said parts of the balanced gear, a gear wheel upon each of said parts, a counter-shaft, a gear wheel thereon meshing with one of said gear wheels, a second counter-shaft, a gear wheel thereon meshing with the other of said gear wheels, the severed halves of an axle, connections independently coupling the halves of said axle with said counter-shafts, and a variable speed mechanism for driving the shaft W.

4. In combination with a power shaft, a counter shaft axially in alinement therewith, means for throwing the same into and out of operative connection with the power shaft, a second counter shaft parallel with the power shaft and adapted to be thrown into and out of operative connection therewith, and a plurality of independently acting transmission means deriving their actuation therefrom adapted to contemporaneously actuate individual mechanical members, substantially as described.

In testimony whereof, I sign this specification in the presence of two witnesses.

HENRY G. McCOMB.

Witnesses:
CHARLES F. BURTON,
MAY E. KOTT.